Patented Feb. 26, 1935

1,992,577

UNITED STATES PATENT OFFICE 1,992,577

BACTERICIDAL PREPARATION

Eugene Moness, Far Rockaway, N. Y., assignor to E. R. Squibb & Sons, New York, N. Y., a corporation of New York No Drawing. Application September 11, 1931, Serial No. 562,420

4 Claims. (Cl. 167—31)

This invention relates to bactericidal preparations containing as their efficient ingredient a hydroxy diphenyl, which term is used herein to mean not only the isomers known as hydroxy diphenyl but also mono- and poly-substituted—for example halogen, alkyl, thiocyano—hydroxy diphenyl.

It is the object of this invention to provide aqueous hydroxydiphenyl-soap solutions so constituted that the hydrocarbon oils which have hitherto been deemed necessary in such preparations— and the presence of which greatly reduces germicidal power—may be dispensed with; that such solutions may be secured in a stable form and be freely miscible with water to give dilutions of at least temporary stability, thus averting the precipitation of the hydroxy diphenyl and consequent loss of potency; and that the maximum bactericidal activity may be attained.

In the practice of this invention, a suitable fatty material is saponified in water with a solution of an alkali—which term is used herein to mean the hydroxide of an alkali metal, of ammonium, or of substituted ammonium (for example, triethanolamine)—, and a hydroxy diphenyl is then added with more alkali. By the additional alkali a portion of the hydroxy diphenyl is neutralized; i. e., converted into its alkali salt, which serves to confer stability upon the hydroxy-diphenyl-soap solution. Instead of being added afterward, the excess of alkali may be introduced at the outset. Addition of an alcohol, for example ethyl or propyl alcohol, during or after the saponification is highly desirable. Preparations so constituted are characterized by exceptional stability, dilutability—being miscible with water in all proportions to give more or less opalescent solutions that are amply stable for the uses to which they are commonly put—, and bactericidal activity.

As an example, 331 g. of linseed oil having a saponification value of 195 may be saponified by heating and agitation with 184.4 g. of accurately assayed 35% potassium hydroxide solution, water being added concurrently to maintain a consistency that will facilitate stirring. When saponification is complete, the soap is cooled and sufficient water is added to bring the weight of the solution to 993 g., three times the mass of the oil used. In the neutral soap thus formed, there is dissolved 507 g. of ethyl alcohol denatured by 10.53% of soft soap U. S. P., and then 390 g. of ortho-hydroxy diphenyl. Now 18.4 g. of the 35% potassium hydroxide solution and 1091.6 cc. of water are added, the mixture is thoroughly agitated, and allowed to stand undisturbed for 48 hours or such other period as may be required for the settling out of flocculent unsaponifiable material originally present in the linseed oil; and the clear liquid is siphoned off.

In the foregoing example, all the potassium hydroxide solution may be introduced at the time of saponification; and in that event the amount of water finally added is 1110 cc. Or, if the alcohol used is 190-proof the respective proportions in the sample may be: linseed oil, 350 g.; potassium hydroxide solution, 195 g.; water, to make 1050 g.; ethyl alcohol, 450 g.; ortho-hydroxy diphenyl, 390 g.; potassium hydroxide solution, 18.4 g.; and water, 1091.6 cc.

As a further example, there may be mixed in a steam-jacketed round-bottom flask 331 g. of linseed oil having a saponification value of 195, 193 g. of 36.77% potassium hydroxide solution, and 507 g. of ethyl alcohol containing 10.53% of soft soap U. S. P.; and, a reflux condenser being attached, the contents are heated to boiling, ebullition is maintained for an hour, and the flask is cooled. This procedure has the advantage of saving steam and time, since the alcoholic solution is more favorable to saponification and requires a lower boiling-temperature than the aqueous. In the cool solution 390 g. of ortho-hydroxy diphenyl is dissolved, and then 1579 cc. of water is added.

Still further examples comprise the following, prepared in the manner above described, the numbers given representing grams, and sufficient water being added in each case to make a kilogram:

III

| | |
|---|---|
| Monobrom 2-hydroxy diphenyl | 100 |
| Linseed oil (saponification value 195) | 55 |
| Potassium hydroxide (50% solution) | 23.7 |
| Ethyl alcohol | 150 |

IV

| | |
|---|---|
| 2-hydroxy 3-chloro diphenyl | 50 |
| Linseed oil (saponification value 195) | 37.5 |
| Potassium hydroxide (50% solution) | 31.2 |
| Ethyl alcohol | 121 |

V

| | |
|---|---|
| 2-hydroxy 5-chloro diphenyl | 60 |
| Linseed oil (saponification value 195) | 25 |
| Coconut oil (saponification value 260) | 25 |
| Potassium hydroxide (50% solution) | 42.9 |
| Ethyl alcohol | 165 |

VI

| | |
|---|---|
| 2-hydroxy 3-chloro diphenyl | 30 |
| 2-hydroxy 5-chloro diphenyl | 30 |
| Linseed oil (saponification value 195) | 25 |
| Coconut oil (saponification value 260) | 25 |
| Potassium hydroxide (50% solution) | 42.9 |
| Ethyl alcohol | 169 |

VII

| | |
|---|---|
| 2-hydroxy 3-chloro diphenyl | 45 |
| 2-hydroxy 5-chloro diphenyl | 12 |
| 2-hydroxy 3,5-dichloro diphenyl | 3 |
| Linseed oil (saponification value 195) | 25 |
| Potassium hydroxide (50% solution) | 32.3 |
| Ethyl alcohol | 174 |

VIII

| | |
|---|---|
| 2-hydroxy 5-normal-propyl diphenyl | 30 |
| Linseed oil (saponification value 195) | 110.5 |
| Potassium hydroxide (50% solution) | 43.2 |
| Ethyl alcohol | 223 |

It will be understood that the embodiments above described in detail are merely illustrative and by no means limitative of the invention, which may assume various other forms—for instance, as to the particular fatty materials, alkalies, hydroxy diphenyls, alcohols, and other ingredients employed, the respective proportions thereof, and the specific procedures followed—within the scope of the appended claims.

I claim:

1. Bactericidal preparations including water and a hydroxy diphenyl and an alkali salt thereof.

2. Bactericidal preparations including water and an ortho-hydroxy diphenyl and an alkali-metal salt thereof.

3. Bactericidal preparations including water, soap, and a hydroxy diphenyl and an alkali salt thereof.

4. Bactericidal preparations including water, soap, and an ortho-hydroxy diphenyl and an alkali-metal salt thereof.

EUGENE MONESS.